United States Patent [19]

Yang et al.

[11] 4,275,353

[45] Jun. 23, 1981

[54] METHOD AND APPARATUS FOR THE DETECTION OF STAGNANT REGIONS IN A FLUIDIZED BED OR IN PNEUMATIC CONVEYING LINES

[75] Inventors: Wen C. Yang, Penn Township, Allegheny County, Pa.; Charles E. Spangler, Davenport, Fla.; Joe P. Morris, Penn Hills; Dale L. Keairns, Swissvale, both of Pa.

[73] Assignee: Westinghouse Electric Corp., Pittsburgh, Pa.

[21] Appl. No.: 69,431

[22] Filed: Aug. 23, 1979

[51] Int. Cl.³ .............................................. G01R 5/28
[52] U.S. Cl. ................................................. 324/454
[58] Field of Search ............... 324/454, 464, 122, 109, 324/72, 72.5, 96, 175, 395; 73/179; 361/212, 226, 229

[56] References Cited

U.S. PATENT DOCUMENTS

| 3,141,131 | 7/1964 | McCog | 324/122 |
| 3,636,763 | 1/1972 | Beck . | |
| 3,679,973 | 7/1972 | Smith . | |
| 3,917,996 | 11/1975 | Wagner | 324/72 |
| 3,919,636 | 11/1975 | Few | 324/72 |
| 3,939,694 | 2/1976 | Guichard . | |
| 3,978,720 | 9/1976 | Ford | 324/395 |
| 4,224,570 | 9/1980 | Meserow | 324/175 |

*Primary Examiner*—Michael J. Tokar
*Attorney, Agent, or Firm*—C. M. Lorin

[57] ABSTRACT

A probe electrode is mounted across the wall of a fluidized bed column or solid particles feed thereto, and an air gap between the probe electrode and a neon lamp causes lamp flashes when the particles are normally circulating and allows the detection of stagnancy of the particles in absence of light flashes.

5 Claims, 4 Drawing Figures

METHOD AND APPARATUS FOR THE DETECTION OF STAGNANT REGIONS IN A FLUIDIZED BED OR IN PNEUMATIC CONVEYING LINES

BACKGROUND OF THE INVENTION

Modern techniques for maximizing the recovery of energy from fossil fuels, or for clean use of low grade fossil fuels, call for fluidized bed gasification and combustion installation. The fluidized bed fuel process typically involves a flow of gases through a bed of solid particles at a velocity sufficiently high to support the weight of the particles but not high enough to carry them out of the bed. Free movement of the particles and high velocity between gas and solids do promote rapid heat transfer. Moreover, flow and handling of the solids constitute an important factor for attaining good efficiency and maintaining the continuity of the reaction process. As a matter of fact, it is the ease and versatility in solid flow handling, and the large amount of solid surface in contact with flowing gas for a relatively small volume, which make the fluidized bed commercially attractive.

Bed temperatures are also very important for monitoring and control, since the free movement of particles favors heat transfer both within the bed and between the bed and adjoining surfaces.

Thus, it is important in a fluidized bed that solid materials can be readily added to, or removed from, a fluidized bed while the counteracting circulation of solids and gas is being maintained at all times with the required intensity.

An object of the present invention is to detect stagnant regions in a fluidized bed. Another object of the present invention is to provide a probe which can be applied to a pneumatic conveying line for the detection of stagnancy of solid particles.

It is known to measure the size of solid particles and their concentration in a dust-laden gas. For instance, in U.S. Pat. No. 3,679,973 the dust particles are initially ionized, then conveyed with the stream of gas into a chamber for measuring the electrical discharge thereacross. Calibration is provided for different particle sizes and different particle concentrations.

It is known from U.S. Pat. No. 3,939,694 to measure the concentration of solid particles suspended in a gas phase of the aerosol or fume type, by passing the aerosol through a fluidized bed of balls whose diameters are greater than those of the largest dust particles, then measuring the intensity of currents flowing from the walls housing the bed. Such current is characteristic of a charge distribution between balls and walls due to collisions between particles.

It is known from U.S. Pat. No. 3,636,763 to electrically measure the flow rate of particular material in a pneumatic conveyor by fixing an insulated electrode across the wall thereof to detect a capacitance effect influenced by mass flow.

The generation of electrostatic charge in a gas fluidized bed is well known. See Boland, D. and Geldart D., in Powder Technology, Vol, 5, Page 289 (1971-1972). The spontaneous generation of electric charges in a pneumatic conveying line has also been reported. See Richardson, J. F. and McLeman, M. in Transaction Institute Chemical Engineers, Vol. 38, Page 257 (1960).

It is also known that dust ignitions might occur spontaneously in a fluidized bed, because of spark discharges. See Boyle, A. R. and Llewellyn J. in Journal Society Chemical Industry, Vol. 69, Page 173 (1947). Indeed, charge generation during fluidization has been recognized as a potential safety hazard.

The attraction between charged particles is known to interfere with the normal hydrodynamics of a fluidized bed. It may affect particle motion and momentum transfer in dilute, turbulent gas solids flow systems. As a result of mutual collisions among particles and between particles and walls positively and negatively charged, surfaces are built up in a fluidized bed through electron transfer. The probability of electron transfer following collision depends primarily upon the properties of the materials, the physical state of their surfaces, and the energy of their impact. A body delivering electrons more readily will become positively charged and vice versa. Thus the prime requirement for static electrification is the making and breaking of surface contact. It follows that electrostatic generation can occur between collisions of conductor and insulator, insulator and insulator, and conductor and conductor although the degree of electrification may be different.

Since a charged particle is essentially a capacitor, it can be charged, or discharged, in contact with other particles, or walls, when the potential difference between the two surfaces is large enough to overcome the contact resistance. Based on these notions, efforts have been made to regulate the electrostatic charge. This can be done only through: (1) changing the effective time of surface contact, and (2) changing the properties of the surface layer.

The consensus in the prior art has generally been towards lowering the electrostatic charge in a fluidized bed. To this goal, the most common methods suggested are: increasing relative humidity in the fluidizing mediums, treating particle surface with conducting films, air ionization and grounding of conducting parts. In fact, these attempts in industry have not been successful. Actually, an electrostatic charge is always present wherever gas-solids flow systems are involved. The present invention rests on a positive approach rather than a negative approach to electrical charging in a fluidized bed.

SUMMARY OF THE INVENTION

Taking advantage of the fact that electric charges are always present in a fluidized bed, and that such electric charges are mostly generated in regions of intense particle agitation. The present invention stems from the realization that an absence of charges should be indicative of stagnation of the particles in the fluidized bed, or in the associated pneumatic conveying lines. Therefore, instead of seeking to establish a quantitative relationship between the degree of charging and the intensity of fludization as has been done in the past. The object of the present invention is to locate stagnant regions which require proper and immediate action in order to keep fluidization at its maximum efficiency.

Therefore, the invention resides in the provision of discharge gap breakdown detectors associated with selected regions of a fluidized bed installation, including the adjoining pneumatic conveying lines, for detecting an absence of electrical discharges as an indication of stagnation of solid particles in the system.

DESCRIPTION OF A FLUIDIZED BED GASIFICATION PROCESSING PLANT OF THE PRIOR ART

Figure 1:
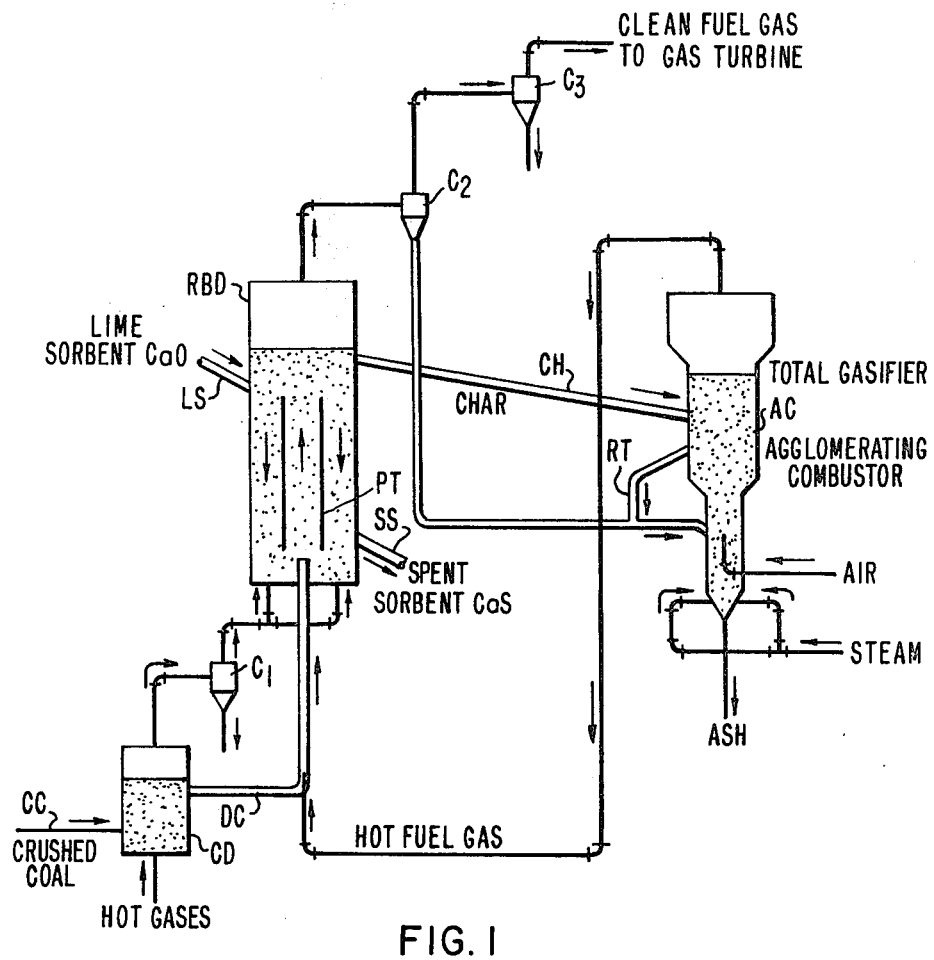
FIG. 1 shows a multistage fluidized bed gasification processing plant of the prior art.

FIG. 1 shows a multistage fluidized bed gasification process plant described by D. H. Archer, D. L. Keairns and E. J. Vidt in a paper entitled "Development of a Fluidized Bed Coal Gasification Process for Electric Power Generation" and presented at the Fourth Synthetic Fuels from Coal Conference of May 6 and 7, 1974 at Oklahoma State University, Stillwater, Okla. This plant illustrates the fluidized bed at three places. The coal dryer vessel CD recieves crushed coal from a duct CC and hot gases are passed through the crushed coal bed at the bottom of the vessel which exhaust into a cyclone $C_1$ at the top of the coal dryer vessel CD. Dry coal is then fed via a duct DC to the bottom of a two-way circulating bed of coal and lime sorbent particles supported by hot fuel gas injected from the bottom of a vessel RBD. While dry coal is being fed by duct DC laterally in the lower region of vessel RBD, lime sorbent CaO is fed towards the surface of the fluidized bed by duct LS. The particulated dry coal is heated and devolatilized in contact of the hot fuel gas under constant recirculation about a partition PT delineating a central draft column for the hot gasses and a peripheral column along the wall. This recirculation favorizes the hydrogasification and devolatilization process. Thus, volatile products are driven off the coal in an atmosphere containing hydrogen, which reacts with the coal and char forming methane and higher hydrocarbons, while releasing heat. The lime sorbent CaO is used for desulfurization, e.g., sulfur released form the coal as $H_2S$ during the gasification process is sorbed. Char at the top of the recirculating bed devolatilizer/desulfurizer RBD vessel is fed via a duct CH into vessel AC known as the agglomerating combustor/gasifier. The gases emerging under pressure at the top of vessel RBD are purified by a cyclone $C_2$ and a third cyclone $C_3$ to generate clean fuel gas fed to a gas turbine. From cyclone $C_2$ the fine char separated is led by duct FC into vessel AC together with a return duct RT. In the agglomerating combustor AC, air and steam are injected at the bottom thereof. Steam reacts with char absorbing heat and forming fuel gases which are reinjected at the base of vessel RBD.

Figures 2A, 2B:
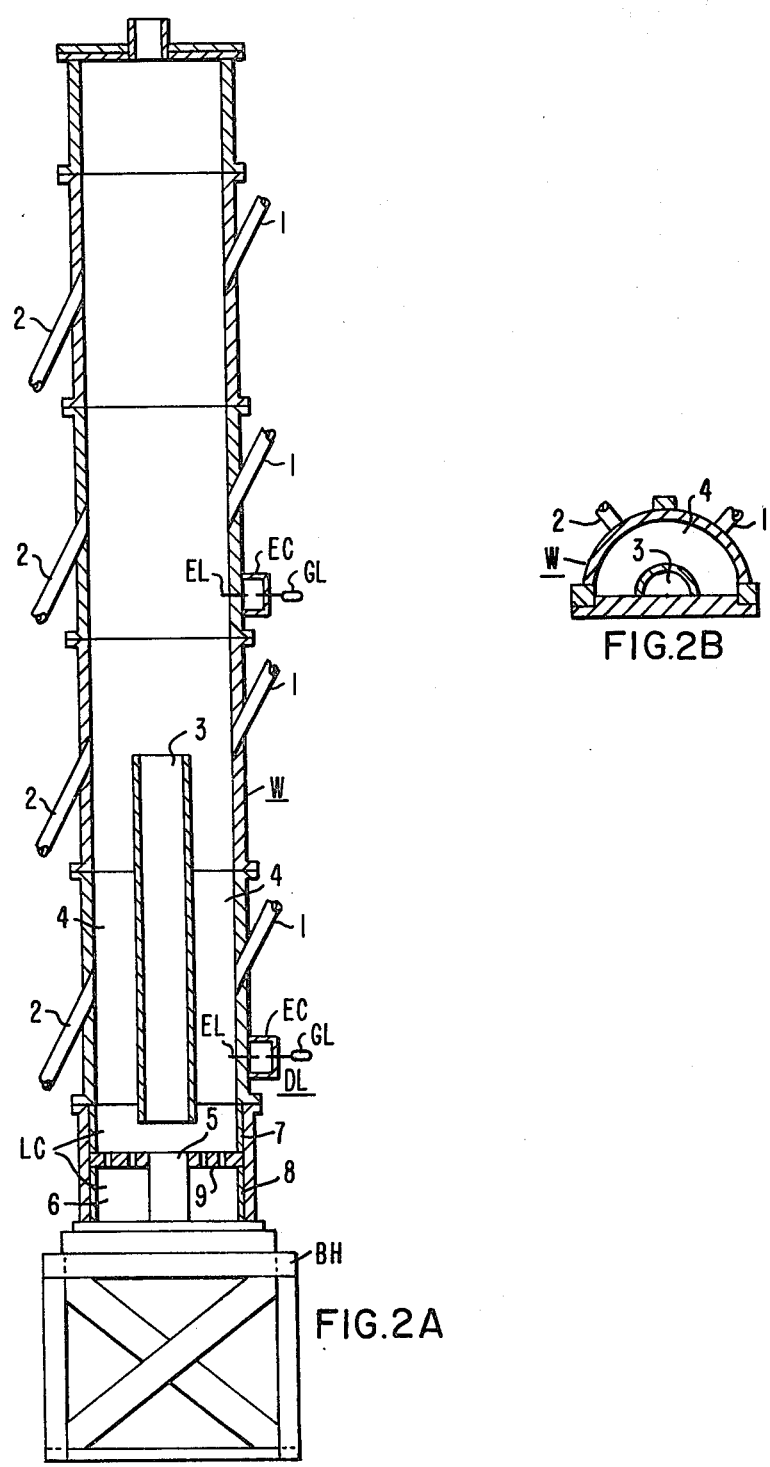
FIG. 2A, 2B are schematic representations of a fluidized bed unit.

Referring to FIG. 2A, a vertical fluidized bed unit is shown illustratively to represent vessel RBD schematically as a semi-circular unit of the section shown by FIG. 2B. The vertical unit of FIG. 2A illustrates on a base housing BH an air inlet associated with the central draft tube 3 defining a peripheral column 4 which is the downcomer for the solid particles of coal return and lime sorbent. Solid feeding and solid withdrawal points are indicated at 1 and 2, respectively. A distribution plate 9 provides air inlets for the downcomer at 6. 7 and 8 are respective upper and lower adjustable spacers for the distributor plate within the lower chamber LC.

A detector DT according to the invention is shown mounted at two locations on the wall outside the down counter 4. Detector DT consists in an electrode probe EL penetrating across the wall into the downcomer region. Probe EL is electrically isolated from the supporting wall. A gap is provided between the outside end of probe EL and the grounded socket of a neon glow lamp GL, so that whichever particles are circulating in the down counter, the electrostatic buildup due to particle in movement will cause a voltage breakdown across the gap so that the lamp will continuously flash during the discharges. The lamp GL and the probe are part of a support which can be an enclosed as schematically and illustratively shown at EC.

Figure 3:
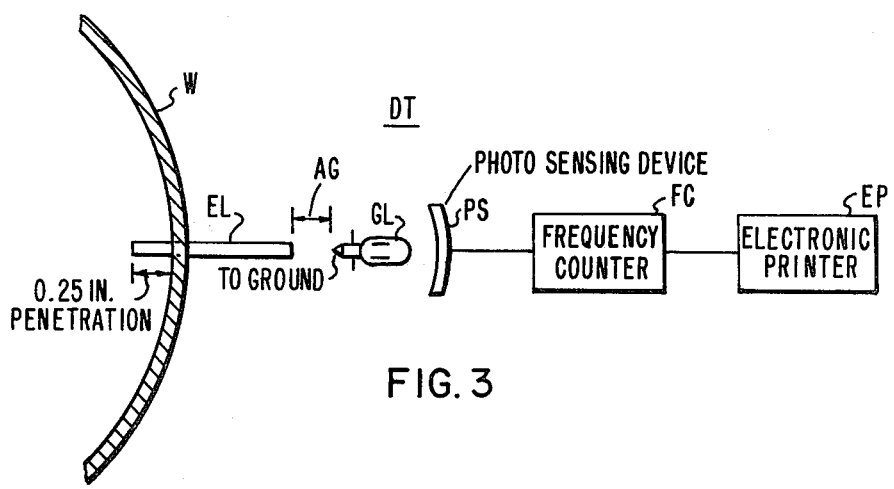
FIG. 3 shows the electrostatic probe according to the invention.

Referring to FIG. 3, detector DT is shown with more details. The probe electrode EL is shown across the wall W of the fluidized bed column, with one end inside the bed and one end facing the neon glow lamp GL leaves a gap therebetween. Typically, electrode EL consists of a stainless steel tubing of 0.25 inch diameter, which is penetrating beyond the wall W by about 0.25 inch. The gap AG is generally less than 0.25 inch, and it is adjustable. Lamp GL typically is a neon glow lamp of 1/25 watts. Having placed such a detector DT in position at any location wherever solid transport or solid circulation could stagnate, an easy and immediate detection of any stagnant region is provided since any lamp, such as GL, which no longer flashes will signal the defective region.

As shown in FIG. 3, the invention also provides for recording flashes of the lamp GL as a function of time. A photo sensing device PS converts the flashes into electric pulses which are applied to a frequency counter FC. The instantaneous count is displayed by an electronic printer EP as a function of time.

Although FIGS. 2A and 2B for the sake of simplification provide only a schematic representation of a devolatilizer, it is understood that a detector DT can be used at any level of the fluidized bed column to detect stagnant regions, for instance above the gas distributor plate after the dolomite inlet, or before the char discharge outlet, as well as in the column portion associated with the downcomer. A detector DT can also be mounted wherever a restricted path, or an elbow in the solid material feed ducts require special attention in detecting stagnation.

I claim:

1. Apparatus for the detection of stagnant particles in a region behind the wall of a container in which solid particles are normally maintained in constant movement by a stream of gas, comprising:

a probe electrode mounted across said wall adjacent said region and isolated from said wall, said probe electrode having a first end exposed to said particles in said region and a second end outside of said container, a gas-filled discharge lamp having an electrode connected to ground potential and an active electrode disposed a predetermined distance from said second end of said probe electrode to define a voltage air gap, said lamp normally generating flashes in succession due to voltage breakdown across said air gap when said solid particles are in movement, and said lamp being devoid of flashes when said solid particles are stagnant in the vicinity of said first end of said probe electrode.

2. The apparatus of claim 1 with said predetermined distance being adjustable.

3. The apparatus of claim 2 with light sensing means responsive to said lamp for providing electric pulses representative of said flashes.

4. The apparatus of claim 3 with counter means responsive to said electric pulses for counting of flashes.

5. The apparatus of claim 4 with means for recording a succession of counts by said counter means as a function of time.

* * * * *